United States Patent
Beichel

[19]

[11] Patent Number: 5,970,702
[45] Date of Patent: *Oct. 26, 1999

[54] REDUCED POLLUTION HYDROCARBON COMBUSTION GAS GENERATOR

[75] Inventor: Rudi Beichel, Sacramento, Calif.

[73] Assignee: Clean Energy Systems, Inc., Sacramento, Calif.

[ * ] Notice: This patent is subject to a terminal disclaimer.

[21] Appl. No.: 08/863,486

[22] Filed: May 27, 1997

Related U.S. Application Data

[60] Continuation of application No. 08/479,928, Aug. 25, 1995, Pat. No. 5,709,077, which is a division of application No. 08/295,417, Aug. 25, 1994, abandoned.

[51] Int. Cl.$^6$ .................................................. F02C 3/30
[52] U.S. Cl. ........................................ 60/39.05; 60/39.12
[58] Field of Search ........................... 60/39.02, 39.05, 60/39.12, 39.17, 39.53, 39.55, 39.59, 39.58, 257, 722, 730, 267, 39.3; 431/158, 160

[56] References Cited

U.S. PATENT DOCUMENTS

| 864,017 | 8/1907 | Miller ..................................... | 60/39.55 |
|---|---|---|---|
| 2,359,108 | 9/1944 | Hoskins .................................... | 60/730 |
| 2,417,835 | 3/1947 | Moore ..................................... | 60/39.55 |
| 2,916,877 | 12/1959 | Walter ..................................... | 60/39.55 |
| 3,459,953 | 8/1969 | Hughes et al. . | |
| 3,779,212 | 12/1973 | Wagner . | |
| 4,224,991 | 9/1980 | Sowa et al. ............................. | 60/39.55 |
| 4,434,613 | 3/1984 | Stahl ..................................... | 60/39.07 |
| 4,456,069 | 6/1984 | Vigneri . | |
| 4,884,529 | 12/1989 | Brynes ................................... | 60/39.55 |
| 5,709,077 | 1/1998 | Beichel ................................... | 60/39.55 |

FOREIGN PATENT DOCUMENTS

| 6394 | 5/1898 | United Kingdom ................... | 60/39.55 |
|---|---|---|---|
| 140516 | 3/1920 | United Kingdom ................... | 60/39.58 |
| 271706 | 5/1927 | United Kingdom ................... | 60/39.55 |
| 2111602 | 7/1983 | United Kingdom ................... | 60/39.07 |
| 94010427 | 5/1994 | WIPO .................................. | 60/39.05 |

*Primary Examiner*—Ted Kim
*Attorney, Agent, or Firm*—Heisler & Associates

[57] ABSTRACT

A gas generator is provided for generating gas including steam and carbon dioxide from the combustion of a hydrocarbon gas with oxygen. The gas generator includes an enclosure with an induction head (201) having an oxygen inlet and a fuel inlet therein, an adapter block (202) to which the induction head (201) attaches and a mixing chamber (203) to which the adapter block (202) is attached. The fuel and oxygen enter the enclosure by first passing through the induction head (201). A start up igniter (210) is located within the induction head (201) to ignite the fuel and oxygen mixture within the enclosure. The adapter block (202) includes a shroud extending away from the induction head (201) and which defines a combustion chamber within the enclosure. The fuel and oxygen mixture is combusted within the combustion chamber before passing out of the shroud of the adapter block (202) and into the mixing chamber (203). The mixing chamber (203) includes a water inlet for the induction of water into the mixing chamber (203) to cool the combustion products exiting the combustion chamber and heat the water entering the mixing chamber (203) from the water inlet. The gas generator generates gas both directly as steam and carbon dioxide which are products of the combustion of the hydrocarbon fuel and the oxygen and by raising a temperature of the water entering the mixing chamber (203) from the water inlet to above its boiling point such that the water is turned into steam. The steam from the combustion chamber and the steam from the water separately entering the mixing chamber (203) are mixed and discharged together at an end of the mixing chamber (203) opposite that of the adapter block (202). The oxygen entering the induction head (201) is free of nitrogen so that the products of combustion are free of nitrogen containing pollutants.

15 Claims, 7 Drawing Sheets

REDUCED POLLUTION HYDROCARBON COMBUSTION GAS GENERATOR

This application is a continuation of application Ser. No. 08/479,928, filed Aug. 25, 1995, now, U.S. Pat. No. 5,709, 077, which is a division of Ser. No. 08/295,417 Aug. 25, 1994, abandoned.

BACKGROUND OF THE INVENTION

1. Field of the Invention

This invention involves the efficient generation of environmentally clean energy, focused on the commercial generation of electrical power. This invention has a number of additional industrial applications where the working fluid used requires variable temperatures and pressures such as in food processing, oil well high energy gas injection, medical and greenhouse facility constant temperature control, and other applications.

2. Description of the Related Art

The current art in generating a major portion of commercial levels of electrical power, in the United States and world-wide, depends upon thermal generating plants burning hydrocarbon fuels (mainly coal and low grade fuel oils) with air, which contains 23.1% oxygen and 76.9% nitrogen by weight, to generate high enthalpy steam which, in turn, is used to drive turbo-electric generators.

The technology of designing, constructing and operating extremely high energy generators for jet engines, rocket engines, and gas turbine auxiliary power systems, has been significantly advanced in recent years. Generation and controlled use of such extremely high energy levels is a specialized practice and is readily adaptable to commercial industry.

The current state-of-the-art in power generation results in the production of atmospheric pollutants, mainly high levels of nitrogen oxides (NOx), sulfur oxides (SOx), carbon monoxide (CO) and particulate matter. Such emissions are at, and in a great many cases above, critical allowed threshhold levels and must be reduced to preserve clean air. Current US regulatory requirements prescribe the amounts of the above listed atmospheric emissions permitted in particular locations by a given power generating plant. Allowable emission thresholds are decreasing over time putting more and more pressure on industry to reduce emissions. Drastic economic penalties are being established, either in the form of fines (called purchased credits) related to the amounts by which emissions exceed allowable limits, or plants can be ordered to cease emitting operations.

In addition to the undesired effects of the build-up of atmospheric pollutants on the quality of the environment, current art extracts further societal prices in terms of the added costs of pollution control and monitoring equipment, and the purchasing of credits which are passed on to the consumers.

There have been many efforts to solve the emissions problem by exploiting non-combustible energy sources, such as windmills, fuel cells, solar cells, closed cycle solar reflector/boilers, use of tidal motion and others. None of these sources can approach the required output levels in a cost-effective manner, with operating efficiency required for large-scale, sustained commercial applications currently supplied by the conventional thermal power generating plants. Nuclear plants can produce at the required levels of outputs, but they have encountered regulatory requirements leading to high costs, and there is a strong societal opposition to increasing use of nuclear power. Hence nuclear power use in the United States is severely restricted.

SUMMARY OF THE INVENTION

This invention is a unique, well developed technology for a high temperature, high pressure combustion device, designed to produce and control an efficient, high energy fluid stream, without generating unacceptable pollution, and which is usable in a variety of embodiments described in this application. The thermo-mechanical design and physical conformation are specific features the purposes of which are efficient operation, pollution avoidance, long life and minimum maintenance. These results are accomplished through unique integration of a number of advanced combustion technologies using selected reactants in a water cooled device generating a high purity steam and carbon dioxide working gas.

Elements of prior specialized technologies are adapted and combined in the design of a thermal power generating plant which can operate cleanly using any of several relatively inexpensive and widely available reactants including liquid oxygen, propane, methane, natural gas, or light alcohols such as ethanol and methanol. These reactants are or can be placed in mass commercial production and distribution, being already in extensive use in other fields such as home heating, cooking, industrial heating, metal cutting and welding, aerospace propulsion applications and others. Further, these reactants can be burned at high temperatures, in high pressure combustors which, while not currently widely used in the power industry, are a practiced art in the aerospace industries, but without emphasis on environmentally clean operation in those applications.

In this invention, the combustor is a high energy, continuous flow device. The liquid reactants are injected into a combustion chamber, via an efficient, high performance, specialized injection device, under high pressure, generating high temperature gas.

In combusting any of the fuels with liquid oxygen, under controlled conditions (i.e., combustor pressure, temperature and fuel/oxidizer mixture ratio) the products of combustion are high pressure, high temperature steam and gaseous carbon dioxide, with virtually no NOx, SOx, CO or particulates generated, depending upon the purity of the fuels and oxidizers used, and the controls of the combustion process. The carbon dioxide product can be recovered during the steam condensing process for commercial use. Current costs of the fuel elements generated in bulk by existing, large scale production facilities, are relatively cost competitive with coal and oil. The energy release in an appropriately scaled reactor produces power at a cost that is competitive with current thermal plants, yet this invention will not yield the massive amounts of polluting gases, thus avoiding the additional penalty costs of pollution control equipment and purchased credits for excess emissions.

A specially configured version of this invention takes the form of a source of a high quality fluid, which can either improve a number of existing commercial applications (e.g. food processing, materials sterilization, oil well injection, etc.), or enable new applications such as intermediately scaled mobile plants for temporary, on-site power support, or non-polluting, steam powered drive systems for large locomotion systems such as trains or ships.

DETAILED DESCRIPTION OF THE PREFERRED EMBODIMENTS

Figure 1:
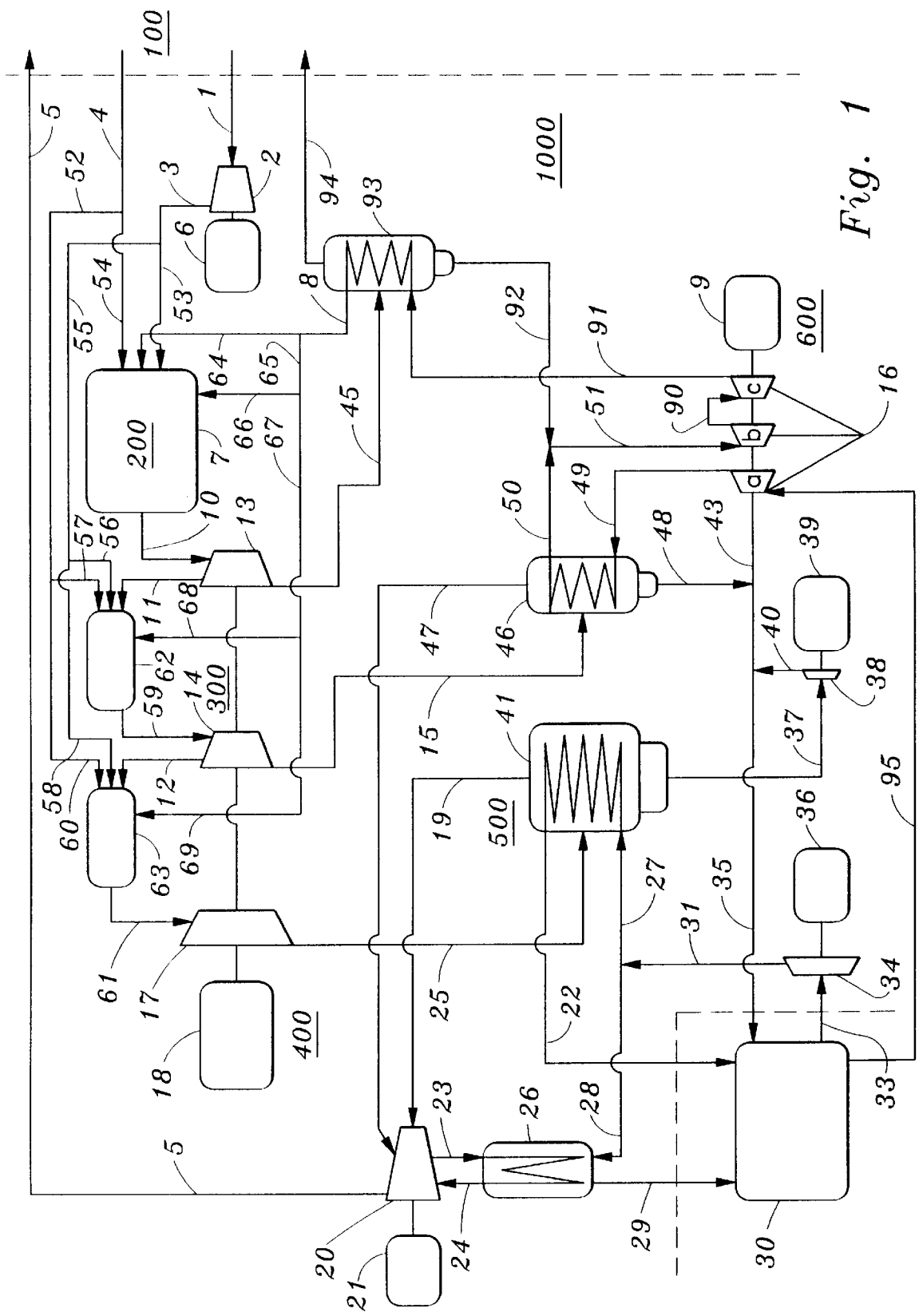
FIG. 1 is a schematic showing an embodiment of the invention, its elements and connectivity that constitute an efficient, pollution-free power generation system. Liquid reactants are shown being introduced to the system from sources that may be either on-site or adjacent production facilities, or from storage facilities. This embodiment features system enhancing elements which maximize energy utilization and minimize component size through turbine drive gas regeneration and inter-turbine drive gas reheating.

FIG. 1. Power Generation System with Reheaters and Regenerators

FIG. 1 illustrates a non-polluting, efficient electrical energy generating power plant 1000, comprising a reactant induction subsystem 100, a gas generation subsystem 200, a reheated turbine drive subsystem 300, an electrical energy generation subsystem 400, an exhaust management subsystem 500, and a regenerated water management subsystem 600.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the high pressure turbine drive 13, in subsystem 300, via discharge line 10. Thermal control of the combustion process can be accomplished by controlling cooling water flow rate to the gas mixing chamber and to the chamber structure via water feed lines 64 and 66, supplied by water service feed line 65, from the water management subsystem 600.

The turbine drive subsystem 300, converts the gas generator subsystem 200 output energy into mechanical energy to drive the electrical generator subsystem 400. The turbine subsystem 300, consists of three power turbines, pressure staged for optimum efficiency, and two inter-turbine reheater units to maximize the energy in the drive gas.

The turbine drive subsystem 300 consists of high pressure power turbine 13, high pressure power turbine exhaust line 11, and high pressure power tap-off line 45. This assembly is followed by an inter-turbine reheater in which the exhaust temperature is brought back to that at the gas generator outlet by combusting the proper amount of the reactants in the reheater chamber and mixing the output with the main flow stream, thus adding energy and maintaining constant inlet temperature going into the next turbine. This takes place in the first inter-turbine reheater 62, which consists of the reheater 62, and reheater LOX feed line 56, reheater fuel feed line 57, reheater water feed line 68, high pressure turbine steam exhaust from line 11, and reheater discharge line 59. This section is followed by a medium pressure range power turbine 14, medium pressure power turbine discharge line 12, medium power turbine tap-off line 15, followed by the second reheater unit consisting of inter-turbine reheater 63, reheater LOX feed line 58, reheater fuel feed line 60, reheater water feed line 69, medium pressure turbine steam exhaust from line 12, and reheater discharge line 61. The turbine power section is terminated by a low pressure power turbine 17, and discharge line 25, which sends the gas flow to an exhaust recovery condenser 41, in the exhaust recovery subsystem 500.

The energy generation subsystem 400 is the electrical energy conversion facility 18, consisting of electrical generator(s), and power conditioning, which develop the end product of this plant, electrical energy.

The exhaust management subsystem 500 is a gas handling subsystem with two purposes: (i) to make the most efficient use of the exhaust products, and (ii) to verify that pollution controls are effective. This subsystem consists of a carbon dioxide recovery branch and a water recovery branch, both serviced by the heat rejection facility 30.

The carbon dioxide recovery assembly receives near ambient temperature, gaseous carbon dioxide ($CO_2$) from the condenser 41, via discharge line 19, and from the water management subsystem 600, via discharge line 47, into compressor 20, which is powered by drive unit 21. After one stage of compression, the gas is delivered to a water cooler 26, via discharge line 23, and, after cooling by passage through the heat exchanger section of the cooler vessel 26, the fluid is returned to compressor 20, via return line 24, and further compressed before discharge to facility return line 5, for recovery processing. Cooling water is supplied to cooler 26, from the heat rejection facility 30, by cooling water pump 34, powered by drive unit 36. Cooling water is drawn through inlet line 33, and delivered through pump discharge line 31, and cooler inlet line 28. After passing through the heat exchanger element in cooler 26, the cooling water is returned to the heat rejection facility 30, via discharge line 29. Carbon dioxide is also recovered from preheater 93 via discharge line 94.

The water recovery branch consists of the condenser vessel 41, cooling water inlet line 27, which sends cooling water through the condenser 41 heat exchanger section to cool down and condense the exhausted steam back to water. The cooling water is then returned to the heat rejection facility 30, via cooling water outlet line 22, and the condensed water is returned to the water management subsystem 600, via discharge line 37.

The water management subsystem 600 maintains the proper water balance in the operating system 1000. It does this by maintaining the proper cooling water injected at the gas generator inlet. The major product of combustion, using the reactants intended for this system, is water, therefore following start-up there is more than enough water available to operate the system. However, to insure adequate water availability during start-up, shut-down, and other transient operations, the heat rejection facility will serve as a reservoir as well as a receiver for any excess water generated. The main elements in the embodiment of the water management subsystem 600 are pressure staged pumps 16a, 16b, and 16c, powered commonly by drive unit 9, condensate pump 38, powered by drive unit 39, and two (2) performance enhancing regenerator units 46 and 93.

The water recovered in the exhaust management subsystem 500 is returned to the water supply from condenser 41, discharge line 37, to condensate water pump 38, which is powered by drive unit 39. Condensate water pump 38 delivers the water to the feed water pumping system via discharge line 40. Excess water is diverted to the heat rejection facility 30, via return line 35, or any required start-up or make-up water is drawn from the heat rejection facility 30, via inlet line 95 and delivered to the inlet of pump 16a. The main water flow is delivered to the feed water pumps 16a, 16b, and 16c by the condensate pump 38, via feed line 43, which is joined by a recirculated flow from the medium pressure turbine tap-off line 15. This tap-off flow serves as the heat source in the heat exchange element of a regenerator device, regenerator 46, to conserve heat energy. The tap-off flow is collected in a sump in regenerator 46, and discharges to the low pressure feed water pump 16a, via discharge line 48, of regenerator 46 and pump 16a inlet line 43. An initial stage of feed water pressurization is accomplished in low pressure feed water pump 16a. The outflow of pump 16a is carried to regenerator 46, via discharge line 49, picks up heat energy in the heat exchanger element in regenerator 46, and then is passed to the medium pressure feed water pump 16b, via heat exchanger outlet line 50 and through inlet line 51. The water flow is joined by a recirculated flow that originates from the high pressure power turbine tap-off line 45. This tap-off flow serves as the heat source in the heat exchange element of the regenerator 93, to further conserve heat energy. The tap-off flow is collected in a sump in regenerator 93, and discharges to the medium pressure feed water pump 16b, via sump discharge line 92, of regenerator 93, and through medium pressure pump inlet line 51. The feed water flow stream is passed to the high pressure pump 16c, via medium pressure feed water pump 16b's discharge line 90. The high pressure pump 16c raises the main stream water pressure to the design level then discharges it via discharge line 91, to the heat exchanger section of regenerator 93, where it picks up more heat energy before finally being passed to the gas generator subsystem 200, and the reheaters 62 and 63, in the power turbine subsystem 300, via discharge line 8, and reheater cooling water line 65. The feed water pumps 16a, 16b and 16c are powered by the common drive unit 9.

Figure 2:
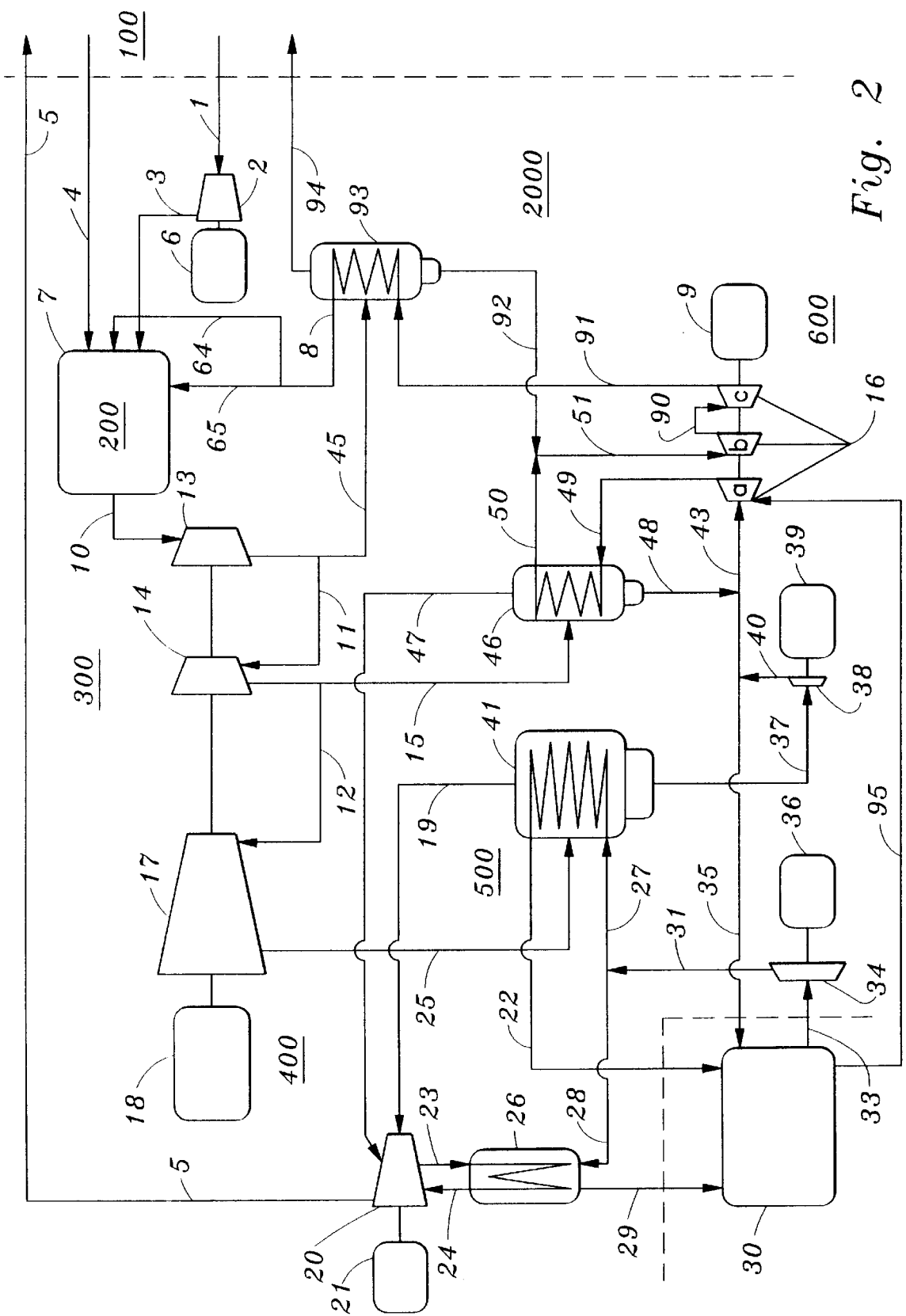
FIG. 2 is a schematic showing an embodiment of the system from which the inter-turbine reheaters were removed, which simplifies the system of FIG. 1, reduces cost, and slightly increases performance, but at the expense of increased component sizes and weights.

FIG. 2. Power Generation System with Regenerators

FIG. 2 illustrates a non-polluting electrical energy generating plant 2000, comprising a reactant induction subsystem 100, a gas generation subsystem 200, a turbine drive subsystem 300, an electrical energy generation subsystem 400, an exhaust management subsystem 500, and a regenerated water management subsystem 600.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the turbine drive subsystem 300, via discharge line 10. Thermal control of the combustion process can be accomplished by controlling cooling water flow rate to the gas mixing chamber and to the chamber structure via water feed lines 64, supplied by water service feed line 65, which also feeds cooling water to the gas generator subsystem 200, from the water management subsystem 600.

The unreheated turbine drive subsystem 300, converts the gas generator subsystem 200 output energy into mechanical energy to drive the electrical generator subsystem 400. The turbine subsystem consists of three power turbines, pressure staged for optimum efficiency.

The turbine drive subsystem 300 consists of high pressure power turbine 13, high pressure power turbine exhaust line 11, and high pressure power tap-off line 45. This assembly is followed by a medium pressure power turbine 14, medium pressure power turbine discharge line 12, and medium power turbine tap-off line 15. The turbine power subsystem 300 is terminated by a low pressure power turbine 17, and discharge line 25, which sends the gas flow to an exhaust recovery condenser 41, in the exhaust recovery subsystem 500.

The energy generation subsystem 400 is the electrical energy conversion facility 18, consisting of electrical generator(s), and power conditioning, which develop the end product of this plant, electrical energy.

The exhaust management subsystem 500 is a gas handling subsystem with two purposes: (i) to make the most efficient use of the exhaust products, and (ii) to verify that pollution controls are effective. This subsystem consists of a carbon dioxide recovery branch and a water recovery branch, both serviced by heat rejection facility 30.

The carbon dioxide recovery assembly receives near ambient temperature, gaseous carbon dioxide (CO2) from the condenser 41, via discharge line 19, and from the water management subsystem 600, via regenrator 46 CO2 gas discharge lines 47, into compressor 20, which is powered by drive unit 21. After a stage of compression, the gas is delivered to a water cooled heat exchanger in cooler unit 26, via discharge line 23. After cooling by passage through the cooler vessel 26, the fluid is returned to the compressor 20, via return line 24, and further compressed before discharge to facility return line 5, for recovery processing. Cooling water is supplied to the cooler 26, from the heat rejection facility 30, by cooling water pump 34, powered by drive unit 36. Cooling water is drawn through inlet line 33, and delivered through pump discharge line 31, and cooler inlet line 28. After passing through the heat exchanger element in cooler 26, the cooling water is returned to the heat rejection facility 30, via discharge line 29. Carbon dioxide is also recovered from preheater 93 via discharge line 94.

The water recovery branch consists of the condenser vessel 41, cooling water inlet line 27, which sends cooling water through the condenser 41 heat exchanger section to cool down and condense the exhausted steam back to water. The cooling water is then returned to the heat rejection facility 30, via cooling water outlet line 22, and the condensed water is returned to the water management subsystem 600, via discharge line 37.

The water management subsystem 600 maintains the proper water balance in the operating system 2000. It does this by maintaining the proper cooling water injected at the gas generator inlet. The major product of combustion, using the reactants intended for this system, is water, therefore following start-up there is more than enough water available to operate the system. However, to insure adequate water availability during start-up, shut-down, and other transient operations, the heat rejection facility will serve as a reservoir as well as a receiver for any excess water generated. The main elements in the embodiment of the water management subsystem 600 are pressure staged pumps 16a, 16b, and 16c, driven commonly by drive unit 9, two (2) performance enhancing regenerator units 46 and 93, and a condensate pump 38, powered by drive unit 39.

The water recovered in the exhaust management subsystem 500 is returned to the water supply from condenser 41, via discharge line 37, to condensate water pump 38, which is powered by drive unit 39. Condensate water pump 38 delivers the water to the feed water pumping system via discharge line 40. Excess water is diverted to the heat rejection facility 30, via return line 35, or any required start-up or make-up water is drawn from the heat rejection facility 30, via inlet line 95 and delivered to the inlet of water pump 16a. The main water flow is delivered to the feed water pumps 16a, 16b and 16c by the condensate pump 38, via feed line 43, which is joined by a recirculated flow from the medium pressure turbine tap-off line 15. This tap-off flow serves as the heat source in the heat exchange element of regenerator 46, to conserve heat energy. The tap-off flow is collected in a sump in regenerator 46, and discharges to the low pressure feed water pump 16a, via discharge line 48, of regenerator 46 and pump 16a inlet line 43. An initial stage of feed water pressurization is accomplished in low pressure feed water pump 16a. The outflow of pump 16a is carried to regenerator 46, via discharge line 49, picks up heat energy in the heat exchanger element in regenerator 46, and then is passed to the medium pressure feed water pump 16b, via regenerator 46 discharge line 50, through inlet line 51. The water flow is joined by a recirculated flow that originates from the high pressure power turbine tap-off line 45. This tap-off flow serves as the heat source in the heat exchange element of the regenerator 93, to further conserve heat energy. The tap-off flow is collected in a sump in regenerator 93, and discharges to the medium pressure feed water pump 16b, via sump discharge line 92, of regenerator 93, and through medium pressure pump inlet line 51. The feed water flow stream is passed to the high pressure pump 16c, via medium pressure feed water pump 16b's discharge line 90. The high pressure pump 16c raises the main stream water pressure to the design level then discharges it via discharge line 91, to the heat exchanger section of regenerator 93, where it picks up more heat energy before finally being passed to the gas generator subsystem 200, via discharge line 8, and cooling water lines 64 and 65. The feed water pumps 16a, 16b and 16c are powered by the common drive unit 9.

Figure 3:
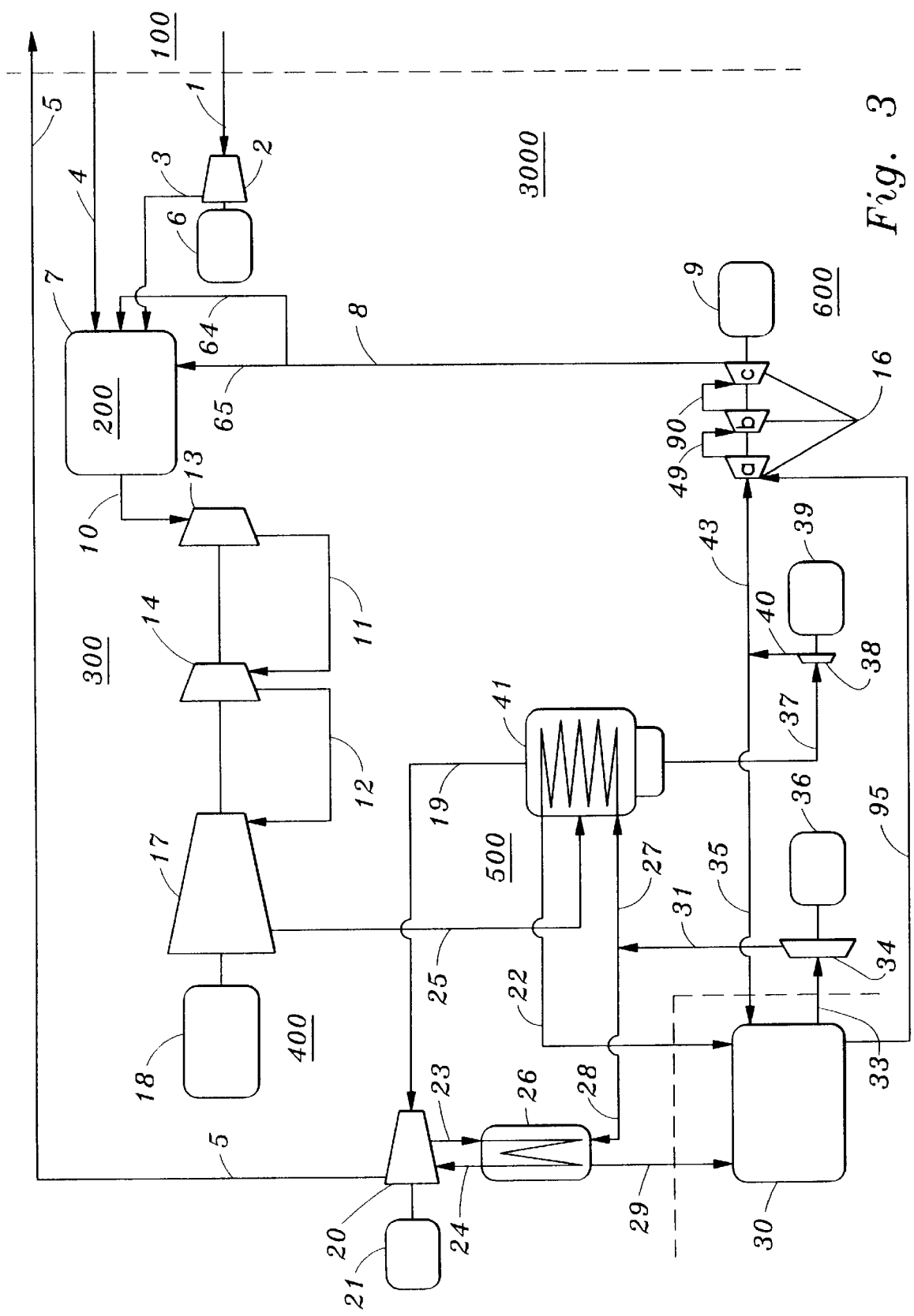
FIG. 3 is a schematic showing an embodiment of the system from which both the reheaters and regenerators were removed, which simplifies the system of FIG. 2, further reduces cost and decreases system performance, but at the expense of further increased component sizes and weights.

FIG. 3. Baseline Power Generation System

FIG. 3 illustrates a non-polluting, efficient electrical energy generating power plant 3000, comprising a reactant induction subsystem 100, a gas generation subsystem 200, a turbine drive subsystem 300, an electrical energy generation subsystem 400, an exhaust management subsystem 500, and an unregenerated water management subsystem 600.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the turbine drive subsystem 300, via discharge line 10. Thermal control of the combustion process can be accomplished by controlling cooling water flow rate to the gas mixing chamber and to the chamber structure via water feed lines 64 and 65, from the water management subsystem 600.

The turbine drive subsystem 300, converts the gas generator subsystem 200 output energy into mechanical energy to drive the electrical generator subsystem 400.

The turbine subsystem consists of three power turbines, pressure staged for optimum efficiency. The turbine drive subsystem 300 consists of high pressure power turbine 13, and high pressure power turbine exhaust line 11. This assembly is followed by a medium pressure power turbine 14, and medium pressure power turbine discharge line 12. The turbine power subsystem 300 is terminated by a low pressure power turbine 17, and discharge line 25, which sends the gas flow to an exhaust recovery condenser 41, in the exhaust recovery subsystem 500.

The energy generation subsystem 400 is the electrical energy conversion facility 18, consisting of electrical generator(s), and power conditioning, which develop the end product of this plant, electrical energy.

The exhaust management subsystem 500 is a gas handling subsystem with two purposes: (i) to make the most efficient use of the exhaust products, and (ii) to verify that pollution controls are effective. This subsystem consists of a carbon dioxide recovery branch and a water recovery branch, both serviced by a heat rejection facility 30.

The carbon dioxide recovery assembly receives near ambient temperature, gaseous carbon dioxide (CO2) from condenser 41, via discharge line 19, into compressor 20, which is powered by drive unit 21. After one stage of compression, the gas is delivered to a water cooled heat exchanger in cooler unit 26, via discharge line 23. After cooling by passage through the cooler vessel 26, the fluid is returned to the compressor 20, via return line 24, and further compressed before discharge to facility return line 5, for recovery processing. Cooling water is supplied to the cooler 26, from the heat rejection facility 30, by cooling water pump 34, powered by drive unit 36. Cooling water is drawn through inlet line 33, and delivered through pump discharge line 31, and cooler inlet line 28. After passing through the heat exchanger element in cooler 26, the cooling water is returned to the heat rejection facility 30, via discharge line 29.

The water recovery branch consists of the condenser vessel 41, cooling water inlet line 27, which sends cooling water through the condenser 41 heat exchanger section to cool down and condense the exhausted steam back to water. The cooling water is then returned to the heat rejection facility 30, via cooling water outlet line 22, and the condensed water is returned to the water management subsystem 600, via discharge line 37.

The water management subsystem 600 maintains the proper water balance in the operating system 3000. It does this by maintaining the proper cooling water injected at the gas generator inlet. The major product of combustion, using the reactants intended for this system, is water, therefore following start-up there is more than enough water available to operate the system. However, to insure adequate water availability during start-up, shut-down, and other transient operations, the heat, rejection facility will serve as a reservoir as well as a receiver for any excess water generated. The main elements in the embodiment of the water management subsystem 600 are pressure staged pumps 16a, 16b, and 16c, powered commonly by drive unit 9, and a condensate pump 38, driven by drive unit 39.

The water recovered in the exhaust management subsystem 500 is returned to the system water supply from condenser 41, discharge line 37, to condensate water pump 38, which is powered by drive unit 39. Condensate water pump 38 delivers the water to the feed water pumping system via discharge line 40. Excess water is diverted to the heat rejection facility 30, via return line 35, or any required start-up or make-up water is drawn from the heat rejection facility 30, via inlet line 95 and delivered to the inlet of water pump 16a. The main water flow is delivered to feed water pumps 16a, 16b and 16c. The condensate pump 38, sends the recovered water to the low pressure feed water pump 16a, via feed line 43. Initial feed water pressurization is accomplished in low pressure feed water pump 16a. The outflow of pump 16a is carried to medium pressure feed water pump 16b by feed water line 49. The medium pressure feed water pump 16b raises the feed water pressure further and passes the feed water flow stream to the high pressure pump 16c, via feed water line 90. The high pressure pump 16c raises the main stream water pressure to the design level before finally being passed to the gas generator subsystem 200 via discharge line 8 and inlet water lines 64 and 65.

Figure 4:
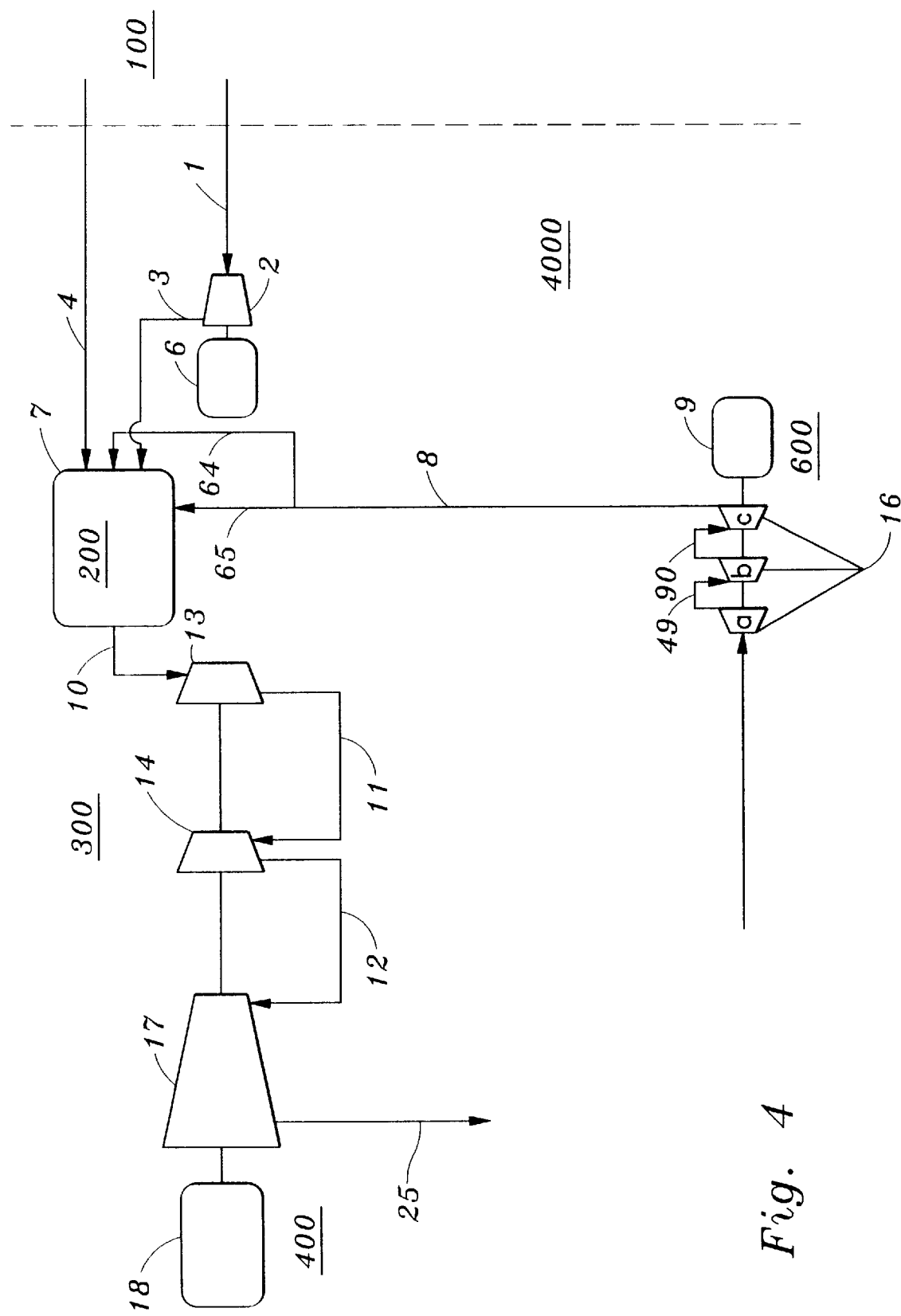
FIG. 4 is a schematic showing an adaptation of embodiment 3, from which the recirculating water curcuit and customer supplied heat rejection system were eliminated, with water supplied from a source (e.g., lake, river, or purified sea water), thus eliminating the complexity and cost of the closed loop water recovery and heat rejection subsystems.

FIG. 4. Simplified Power Generation System

FIG. 4 illustrates a minimum polluting, efficient electrical energy generating power plant 4000, comprising a reactant induction subsystem 100, a gas generation subsystem 200, a turbine drive subsystem 300, an electrical energy generation subsystem 400, and a limited water management subsystem 600. The limited exhaust gas management subsystem 500 is eliminated in this embodiment. This embodiment has a reduced complexity, hence reduced costs, for both acquisition and maintenance.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the turbine drive subsystem 300, via discharge line 10. Thermal control of the combustion process can be accomplished by controlling cooling water flow rate to the gas mixing chamber and to the chamber structure via water feed lines 64 and 65. This embodiment is suited for sites where water availability makes the complexity and cost of a water recovery system unnecessary.

The turbine drive subsystem 300, converts the gas generator subsystem 200 output energy into mechanical energy to drive the electrical generator subsystem 400. The turbine subsystem consists of three power turbines, pressure staged for optimum efficiency.

The turbine drive subsystem 300 consists of high pressure power turbine 13, and high pressure power turbine exhaust line 11. This assembly is followed by a medium pressure power turbine 14, and medium pressure power turbine discharge line 12. The turbine power subsystem 300 is terminated by a low pressure power turbine 17, and discharge line 25, which discharges the exhaust to the atmosphere.

The energy generation subsystem 400 is the electrical energy conversion facility 18, consisting of electrical generator(s), and power conditioning, which develop the end product of this plant, electrical energy.

In this embodiment the exhaust management subsystem 500 is deleted and the low pressure turbine exhaust gases are vented to the atmosphere.

For this embodiment the water management subsystem 600 draws cooling water from a nearby water source. The main elements in this embodiment of water management subsytem 600 are pressure staged pumps 16a, 16b, and 16c, powered commonly by drive unit 9. The water flow is drawn by the feed water pumps 16a, 16b, and 16c, through intake line 43. The initial stage of feed water pressurization is accomplished in low pressure feed pump 16a. The out-flow of pump 16a is carried via discharge line 49, to the medium pressure feed water pump 16b. From medium pressure feed pump 16b, the feed water flow stream is passed to the high pressure pump 16c, via medium pressure feed water pump 16b's discharge line 90. The high pressure pump 16c raises the main stream water pressure to its design level and delivers the water to the gas generator subsystem 200 via discharge line 8 and cooling water lines 64 and 65.

Figure 5:
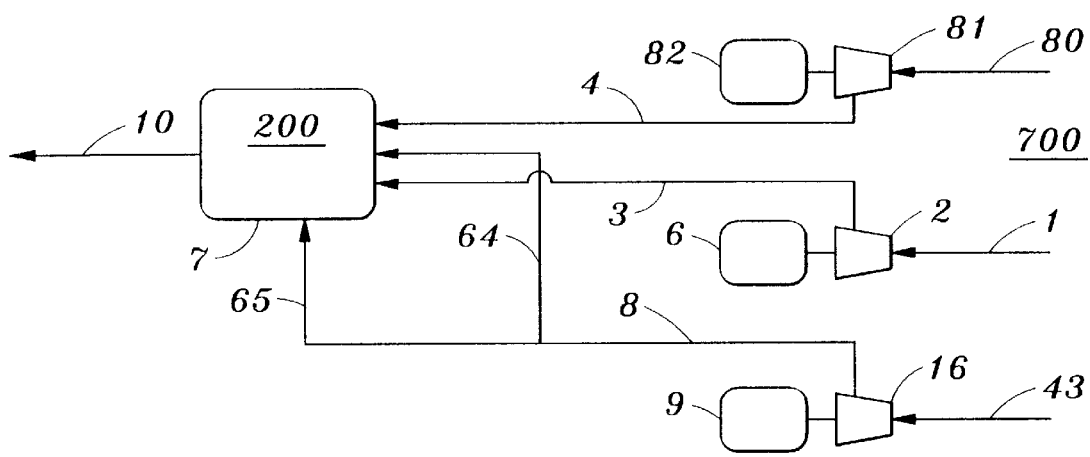
FIG. 5 is an illustration of an embodiment of the basic concept which uses those elements of the system required to generate the drive gas only. The generation of the high pressure, high temperature, high purity steam and carbon dioxide mixture that this system is capable of delivering has multiple industrial applications (e.g's., oil well injection, material sterilization, or heating of large structures or building complexes, and others).

FIG. 5. High Pressure Steam/CO2 Generation System

FIG. 5 illustrates a non-polluting, high energy industrial fluid generation plant 5000, comprising a reactant service subsytem 700, and a gas generation subsystem 200.

The reactant service subsystem 700 feeds and controls the flow of fuel and oxidizer reactants that power this system. This includes a liquid oxygen inlet line 1, feeding a high pressure LOX pump 2, driven by drive unit 6. The LOX pump 2, delivers high pressure LOX to the gas generator subsytem 200, via the pump discharge line 3. Inlet line 80 feeds liquid fuel to high pressure pump 81, which is powered by drive unit 82. Pump 81 delivers high pressure fuel to the gas generator subsystem 200 via discharge line 4. Inlet line 43 delivers cooling feed water to the high pressure pump 16, which is powered by drive unit 9. The high pressure cooling water is delivered to the gas generator subsystem 200 via pump discharge line 8. This flow is split at line 8 outlet into cooling water for delivery to the gas generator 200's internal combustor chamber cooling via feed line 64, and to the internal gas-water mixing chamber section via inlet line 65.

The drive gas generator subsystem 200 includes a gas generator 7, which combusts the injected reactants under controlled conditions, producing a high pressure, high temperature gaseous mixture of steam and carbon dioxide, a high energy fluid suitable for a wide range of industrial applications, via discharge line 10. Thermal control of the combustion process is accomplished by controlling cooling water flow rate to an internal combustion chamber and to the gas-water mixing chamber via water feed lines 64 and 65.

Figure 6:
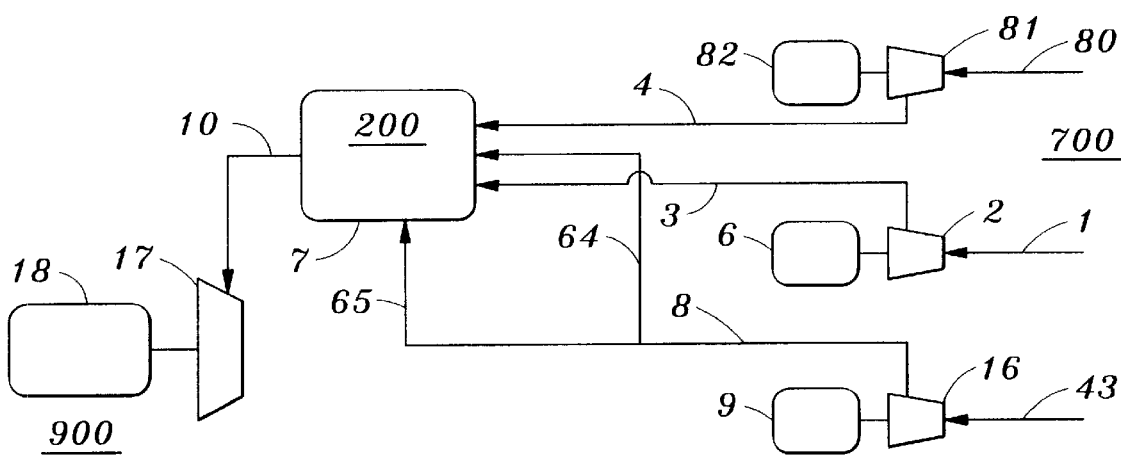
FIG. 6 is an illustration of an embodiment that is a modification of FIG. 5, wherein the gas generator output is used to power a turbogenerator set, with components sized to mount on a mobile platform for applications such as remote site construction or exploration, auxiliary or peaking power supply, service power, or large locomotive drive applications, such as for trains or ships.

FIG. 6. Auxiliary/Transportation Power Generation System

FIG. 6 illustrates a non-polluting, efficient, auxiliary and/or transportation power system 6000. This embodiment augments embodiment 5000, subsystems 700 and 200 with an energy conversion subsystem 900, to produce a power system that can be scaled in size to a wide spectrum of industrial applications (e.g's., stand-by emegency power, peaking power, portable remote site power, nonpolluting steam train power, ocean-going vessels, and many other similar applications).

The reactant service subsytem 700 feeds and controls the flow of fuel and oxidizer reactants that power this system and the gas generator subsystem 200 cooling water. This includes a liquid oxygen inlet line 1, feeding a high pressure LOX pump 2, which is driven by drive unit 6. The LOX pump 2 delivers high pressure LOX to the gas generator subsytem 200, via the pump discharge line 3. Inlet line 80 feeds liquid fuel to high pressure pump 81, which is powered by drive unit 82. Pump 81 delivers high pressure fuel to the gas generator subsystem 200 via discharge line 4. Inlet line 43 delivers cooling feed water to the high pressure pump 16, which is powered by drive unit 9. The high pressure cooling water is delivered to the gas generator subsystem 200 via pump discharge line 8.

The drive gas generator subsystem 200 includes a gas generator 7, which combusts the injected reactants under controlled conditions, producing a high pressure, high temperature gaseous mixture of steam and carbon dioxide, a high energy drive fluid delivered to the drive turbine 17, of the energy generation subsystem 900, via discharge line 10. Thermal control is accomplished by controlling cooling water flow rate picked up from discharge line 8 of the reactant service subsystem 700. This flow stream is split and directed to an internal combustion chamber via inlet line 64, and to the main mixing chamber section via water inlet line 65.

The energy generation subsystem 900 is the electrical energy conversion facility power turbine 17, and the electric motor/generator unit 18, which can be harnessed to any number of industrial applications.

Figure 7:
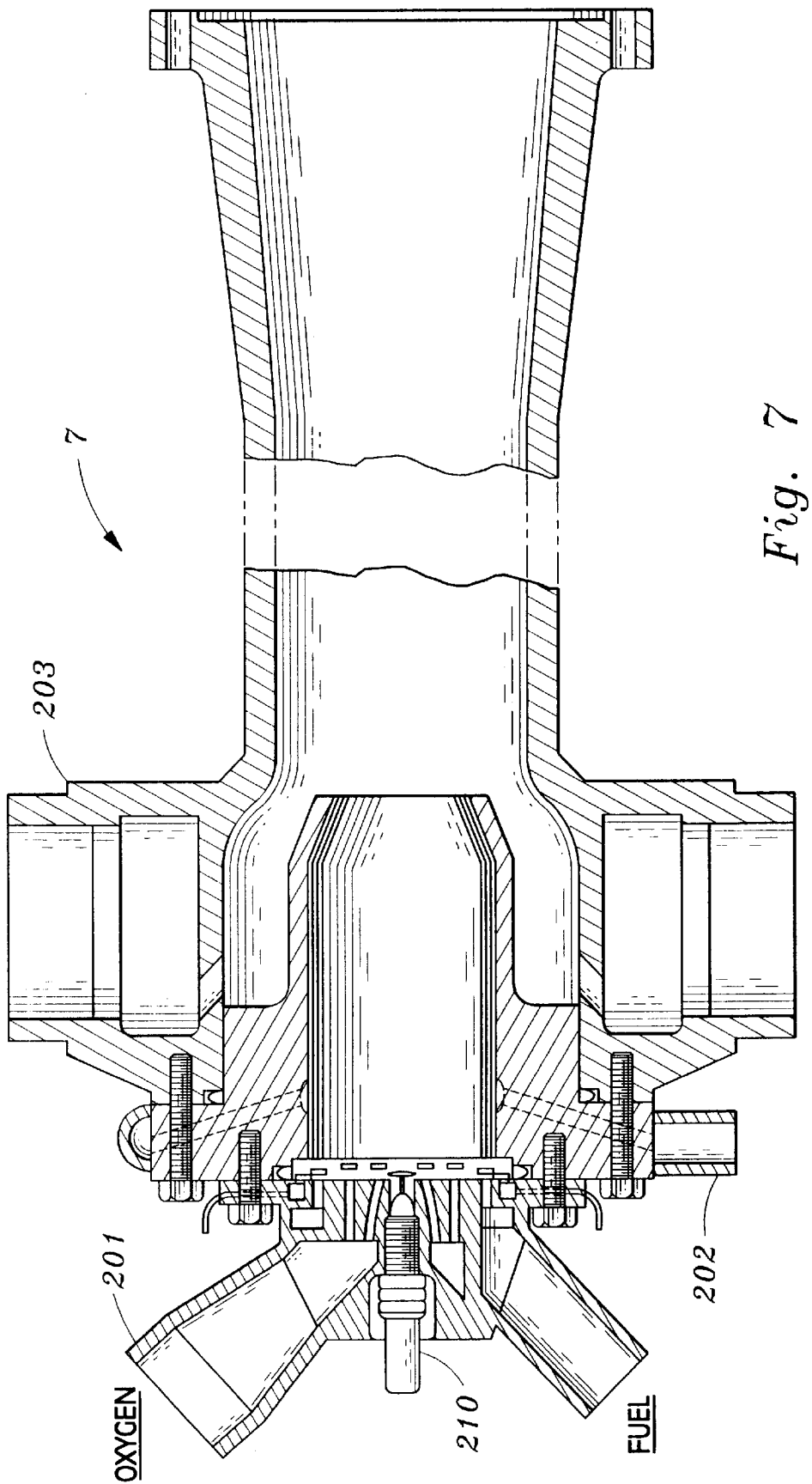
FIG. 7 is a cut-away diagram showing the elements of the main reactor (or gas generator). This illustration shows the functional elements of the device, including the reactants' inlets and manifolds, the injector, the transpiration cooled combustion chamber, and the internal mixing chamber and outlet.

FIG. 7. Gas Generator

FIG. 7 is a cut-away view of a unique, advanced technology combustor device which is the gas generator used to develop the high energy gas used in all the embodiments contained in this application. Its configuration and operation are designed to develop and control the high energy, non-polluting fluid in the most efficient, cost-effective manner. The thermo-mechanical design and physical conformation are specific features the purposes of which are efficient operation, pollution avoidance, long life and minimum maintenance.

The device is composed of a start-up igniter 200, a fluid induction head 201, containing oxygen and gaseous or liquid fuel inlets and integral distribution channels, an injector face water cooling inlet and distribution circuitry, a micro-ported reactant injector body, and a water cooled combustor. The fluid induction head interfaces with an adapter block 202 which contains an inlet and distribution passages to feed cooling water to the wall of the combustor element of the fluid induction head. The adapter block 202 is also the interface to the device mixing chamber 203. The mixing chamber has inlets for the induction of the major portion of the water flow which mixes with the hot gas in the chamber to attain the design drive gas temperature. In addition, the manner in which this flow stream is introduced cools the walls of the mixing chamber, maintaining wall temperature at the design level.

Figure 8:
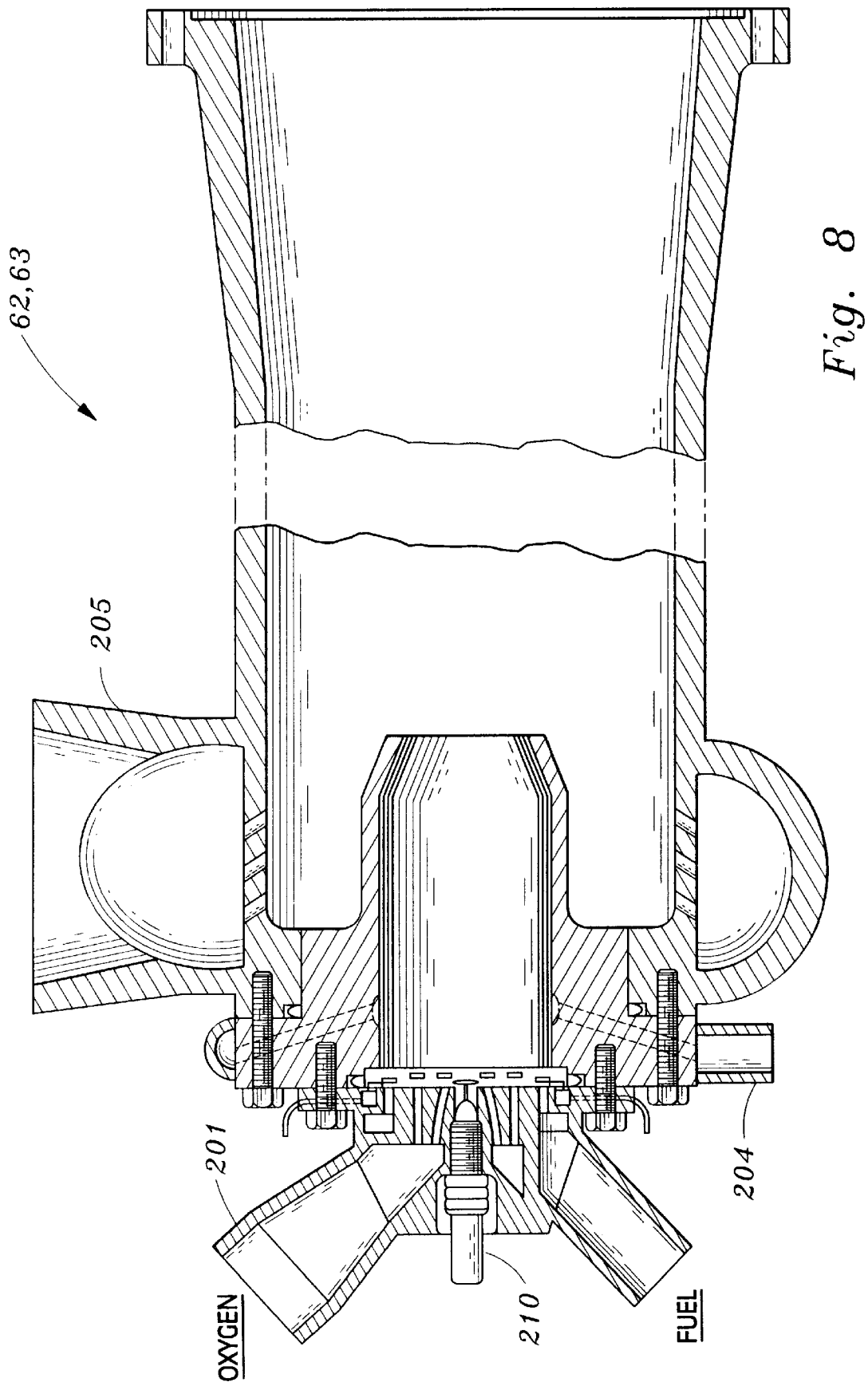
FIG. 8 is a cut-away of a typical inter-turbine reheater. The device is a specialized version of the main reactor. The size of an individual reheater is dependent on the physical state of the outflow received from the preceding turbine unit.

FIG. 8. Drive Gas Reheater

FIG. 8 is a cut-away view of a unique, advanced technology drive gas reheater which can be used to boost the temperature of a drive gas stream after it has passed through an energy extracting device like a power turbine. While this approach to energy management in a power system has a small penalty in overall system efficiency, it allows a reduction in the size and weight of certain components. The thermo-mechanical design and physical conformation are specific features, the purposes of which are efficient operation, long life and minimal maintenance.

The device is composed of the same start-up igniter 200 used in the gas generator, FIG. 7, a fluid management head 201 containing oxygen and fuel inlets and integral distribution channels, an injector face water cooling inlet and distribution circuitry, a micro-ported reactant injector body, and a water cooled combustor. This item is the same as item 202 in the gas generator in FIG. 7. The fluid induction head interfaces with an adapter block 204 which contains an inlet and distribution passages to feed cooling water to the wall of the combustor element of the fluid induction head 201. The adapter block 204 is similarly configured to item 201 in the gas generator device in FIG. 7, except that the outer flange diameter is sized to interface with the gas induction and mixing chamber 205. The mixing chamber has inlets for the induction of the gas flow from the preceding device (e.g., preceding turbine exhaust) and to mix the inducted gas with the hot gas generated in the preheater combustor in item 204. This mixing is done to raise the inducted gas temperature back to the same level it had at the entrance of the preceding device. This element is similar to that in FIG. 7, except that its fore and aft diameters are matched to the preceding and following devices in the total gas flow path, and the inlets induct gas rather than water and are sized accordingly.

What is claimed:

1. A gas generator for producing steam directly from products of combustion, comprising in combination:

at least one oxygen inlet;

at least one fuel inlet, said fuel including hydrogen and carbon;

means to ignite the fuel such that combustion occurs and steam is generated within said gas generator along with carbon dioxide;

at least one water inlet, said water inlet in fluid communication with the steam and the carbon dioxide generated within said gas generator;

said gas generator having a walled enclosure with a center line, said gas generator including said at least one fuel inlet passing through a wall of said enclosure and coupled to a source of elevated pressure fuel, said at least one oxygen inlet passing through said wall of said enclosure and coupled to a source of elevated pressure oxygen, at least one water flow inlet coupled to a source of water, said water flow inlet passing through said wall of said enclosure at a location on said wall of said enclosure spaced from said fuel inlet and said oxygen inlet, a mixing chamber oriented within said enclosure wherein products of combustion of the fuel and the oxygen mix with the water from said water flow inlet, and a discharge passing out of said enclosure for a mixture of both the gaseous products of combustion including steam and carbon dioxide produced within said enclosure from reaction of the fuel and the oxygen therein and gaseous phase water within said enclosure and originally provided from said water flow inlet;

wherein said fuel inlet and said oxygen inlet are located within an induction head portion of said enclosure, said induction head having a planar side facing said enclosure, said planar side supporting said fuel inlet and said oxygen inlet;

wherein said planar side of said induction head is perpendicular to a direction of fuel and oxygen flow into said enclosure;

wherein said enclosure includes at least three separate units including said induction head, an adapter block and said mixing chamber;

wherein said discharge is located in said mixing chamber of said enclosure at a location on said mixing chamber most distant from said induction head;

wherein said adapter block includes a hollow cylindrical shroud having a central axis aligned perpendicular to said planar side of said induction head in a position which corresponds with said center line of said enclosure, said cylindrical shroud having a first end adjacent said induction head and a second end opposite said first end, said second end located free from contact with said walls of said enclosure; and wherein said shroud includes a hollow interior and an exterior surface facing away from said hollow interior, said fuel inlet and said oxygen inlet oriented within said hollow interior, said water flow inlet located outside of said hollow interior and adjacent said exterior surface of said shroud, said second end of said shroud having a tapered throat thereon, said tapered throat having a diameter less than a diameter of said first end of said cylindrical shroud adjacent said planar side of said induction head.

2. The gas generator of claim 1 wherein said oxygen inlet and said fuel inlet are oriented within an induction head of said gas generator, said induction head having a planar side facing an interior of said combustion chamber of said gas generator, said induction head including pathways therein which form water distribution circuitry therein, said pathways coupled to said water inlet, such that a portion of the water from said water inlet passes through said pathways.

3. The gas generator of claim 2 wherein said induction head includes multiple inlets for passage of oxygen and fuel through said planar side, such that a plurality of ports for said fuel and oxygen are provided into said combustion chamber.

4. The gas generator of claim 1 wherein said water inlet receives at least a portion of the water delivered thereby from the steam generated within said gas generator and exiting a discharge of said gas generator, following energy extraction, condensation including separation of the carbon dioxide from the steam, and pumping operation.

5. The gas generator of claim 1 wherein said combustion chamber has sides thereof provided by a hollow cylindrical shroud having a central axis aligned parallel to the flow of the steam and the carbon dioxide between said combustion chamber and said mixing chamber.

6. The gas generator of claim 1 wherein said tapered throat defines a transition between said combustion chamber and said mixing chamber.

7. The gas generator of claim 1 wherein said throat is circular and aligned with a center line of said mixing chamber, such that said throat is centered within said mixing chamber;

said throat spaced from walls of said mixing chamber by a width of said water inlet into said mixing chamber; and said water inlet surrounding said throat.

8. A method for generating gas including steam directly from products of combustion, including the steps of:

providing a source of elevated pressure oxygen;

providing a source of elevated pressure fuel, the fuel including hydrogen and carbon;

providing a gas generator having a walled enclosure with a center line, the gas generator including at least one fuel inlet passing through a wall of the enclosure and coupled to the source of elevated pressure fuel, at least one oxygen inlet passing through the wall of the enclosure and coupled to the source of elevated pressure oxygen, a means to initiate combustion of the fuel within the generator, a means to combust the fuel with the oxygen to generate a gas including steam and carbon dioxide as products of combustion, at least one water flow inlet coupled to a source of water, the water flow inlet passing through the wall of the enclosure at a location on the wall of the enclosure spaced from the fuel inlet and the oxygen inlet, a mixing chamber oriented within the enclosure wherein products of combustion of the fuel and the oxygen mix with the water from the water flow inlet, and a discharge passing out of the enclosure for a mixture of both the gaseous products of combustion including steam and carbon dioxide produced within the enclosure from reaction of the fuel and the oxygen therein and gaseous phase water within the enclosure and originally provided from the water flow inlet; wherein the fuel inlet and the oxygen inlet are located within an induction head portion of the enclosure, the induction head having a planar side facing the enclosure, the planar side supporting the fuel inlet and the oxygen inlet; wherein the planar side of the induction head is perpendicular to a direction of fuel and oxygen flow into the enclosure; wherein the enclosure includes at least three separate units including the induction head, an adapter block and the mixing chamber; wherein the discharge is located in the mixing chamber of the enclosure at a location on the mixing chamber most distant from the induction head; wherein the adapter block includes a hollow cylindrical shroud having a central axis aligned perpendicular to the planar side of the induction head in a position which corresponds with the center line of the enclosure, the cylindrical shroud having a first end adjacent the induction head and a second end opposite the first end, the second end located free from contact with the walls of the enclosure; and wherein the shroud includes a hollow interior and an exterior surface facing away from the hollow interior, the fuel inlet and the oxygen inlet oriented within the hollow interior, the water inlet located outside of the hollow interior and adjacent the exterior surface of the shroud, the second end of the shroud having a tapered throat thereon, the tapered throat having a diameter less than a diameter of the first end of the cylindrical shroud adjacent the planar side of the induction head;

mixing the oxygen and the fuel at a ratio necessary to produce substantially only water and carbon dioxide upon combustion of the fuel with the oxygen;

porting the mixture of oxygen and fuel into a combustion chamber within the enclosure where the means to initiate combustion is provided;

igniting the mixture of fuel and oxygen within the combustion chamber with the combustion initiation means to generate combustion products including steam and carbon dioxide;

discharging steam and carbon dioxide out of the combustion chamber and into the mixing chamber;

providing fluid pathways which provide distribution circuitry for cooling water, the distribution circuitry provided proximate to and between the fuel and oxygen inlets when the fuel and oxygen is ported into the combustion chamber;

directing cooling water into the mixing chamber;

mixing the cooling water with the combustion products;

collecting water from the mixture of cooling water and combustion products formed in said mixing step; and returning at least a portion of the water collected in said collecting step, the water including steam generated in said igniting step, for use as cooling water in said directing step.

9. The method of claim 8 including the further steps of:

arranging the combustion chamber to include at least two separate units including an induction head supporting fuel and oxygen inlets and an adapter block;

configuring the adapter block to include a hollow cylindrical shroud having a central axis aligned parallel to a direction of flow of the steam and carbon dioxide out of the combustion chamber and into the mixing chamber, the cylindrical shroud having a first end adjacent the induction head and a second end opposite the first end, the second end adjacent the mixing chamber but located free from contact with walls of the mixing chamber; and configuring the shroud to include a hollow interior and an exterior surface facing away from the hollow interior, the fuel and oxygen inlets oriented within the hollow interior, the water inlet located outside of the hollow interior and adjacent the exterior surface of the shroud before the water inlet passes into the mixing chamber, the second end of the shroud having a tapered throat thereon, the tapered throat having a diameter less than a diameter of the first end of the cylindrical shroud adjacent the induction head.

10. The method of claim 8 including the further step of aligning the cooling water co-flowing with steam and carbon dioxide which is exiting the combustion chamber and entering the mixing chamber, the cooling water located between walls of the mixing chamber and the steam and the carbon dioxide which is exiting the combustion chamber.

11. The method of claim 10 including the further steps of:

configuring the combustion chamber to include sides defined by a hollow cylindrical shroud having a central axis aligned parallel with the direction of flow of the steam and carbon dioxide exiting the combustion chamber, the throat defining a transition between the combustion chamber and the mixing chamber.

12. A gas generator for a low emissions power generating system, comprising in combination:

a walled enclosure including a combustor portion, a mixing chamber and a discharge, said mixing chamber located downstream from said combustor portion;

at least one oxygen inlet into said combustor portion of said enclosure coupled to a source of oxygen;

at least one fuel inlet into said combustor portion of said enclosure coupled to a source of hydrocarbon fuel;

at least one water distribution circuit oriented within walls of said combustor portion of said enclosure;

means to combust said fuel with said oxygen within said combustor portion of said enclosure to generate combustion products including steam and carbon dioxide;

at least one water flow inlet into said mixing chamber of said enclosure, said mixing chamber providing a region for mixing the combustion products with water from the water flow inlet;

wherein said water distribution circuit and said water flow inlet are coupled to a source of water replenished from at least a portion of gas generated within said gas generator and exiting said enclosure through said discharge said walled enclosure having a center line, said enclosure including said at least one fuel inlet passing through a wall of said enclosure and coupled to said source of hydrocarbon fuel, said at least one oxygen inlet passing through said wall of said enclosure and coupled to said source of oxygen, said at least one water flow inlet coupled to a source of water, said water flow inlet passing through said wall of said enclosure at a location on said wall of said enclosure spaced from said fuel inlet and said oxygen inlet, said mixing chamber oriented within said enclosure wherein products of combustion of the fuel and the oxygen mix with the water from said water flow inlet, and said discharge passing out of said enclosure for a mixture of both the gaseous products of combustion including steam and carbon dioxide produced within said enclosure from reaction of the fuel and the oxygen therein and gaseous phase water within said enclosure and originally provided from said water flow inlet;

wherein said fuel inlet and said oxygen inlet are located within an induction head portion of said enclosure, said induction head having a planar side facing said enclosure, said planar side supporting said fuel inlet and said oxygen inlet;

wherein said planar side of said induction head is perpendicular to a direction of fuel and oxygen flow into said enclosure;

wherein said enclosure includes at least three separate units including said induction head, an adapter block and said mixing chamber;

wherein said discharge is located in said mixing chamber of said enclosure at a location on said mixing chamber most distant from said induction head;

wherein said adapter block includes a hollow cylindrical shroud having a central axis aligned perpendicular to said planar side of said induction head in a position which corresponds with said center line of said enclosure, said cylindrical shroud having a first end adjacent said induction head and a second end opposite said first end, said second end located free from contact with said walls of said enclosure; and wherein said shroud includes a hollow interior and an exterior surface facing away from said hollow interior, said fuel inlet and said oxygen inlet oriented within said hollow interior, said water inlet located outside of said hollow interior and adjacent said exterior surface of said shroud, said second end of said shroud having a tapered throat thereon, said tapered throat having a diameter less than a diameter of said first end of said cylindrical shroud adjacent said planar side of said induction head.

13. The gas generator of claim 12 wherein said water flow inlet is aligned to flow parallel to a flow direction of the combustion products exiting said combustor portion and entering said mixing chamber co-flowing with the combustion products out of said combustor portion, and with said water flow inlet located between a wall of said mixing chamber and the products of combustion.

14. The gas generator of claim 12 wherein said combustor portion has sides thereof provided by a hollow cylindrical shroud having a central axis aligned parallel to the flow of the combustion products between said combustor portion and said mixing chamber, said central axis of said shroud in a position which corresponds with a center line of said enclosure, said cylindrical shroud having a first end adjacent said fuel and oxygen inlets and a second end opposite said first end, said second end located free from contact with walls of said mixing chamber.

15. The gas generator of claim 14 wherein said second end of said shroud includes a tapering throat having a diameter less than a diameter of said first end of said shroud, said water flow inlet oriented between said tapered throat and said walls of said mixing chamber and surrounding said throat, such that said water flow inlet is annular in shape and provides water from said source of water between said combustion products exiting said combustor portion through said throat and said walls of said mixing chamber.

* * * * *